April 19, 1949.   F. G. HODSDON   2,467,749
HOT-WATER HEATER
Filed Oct. 16, 1944
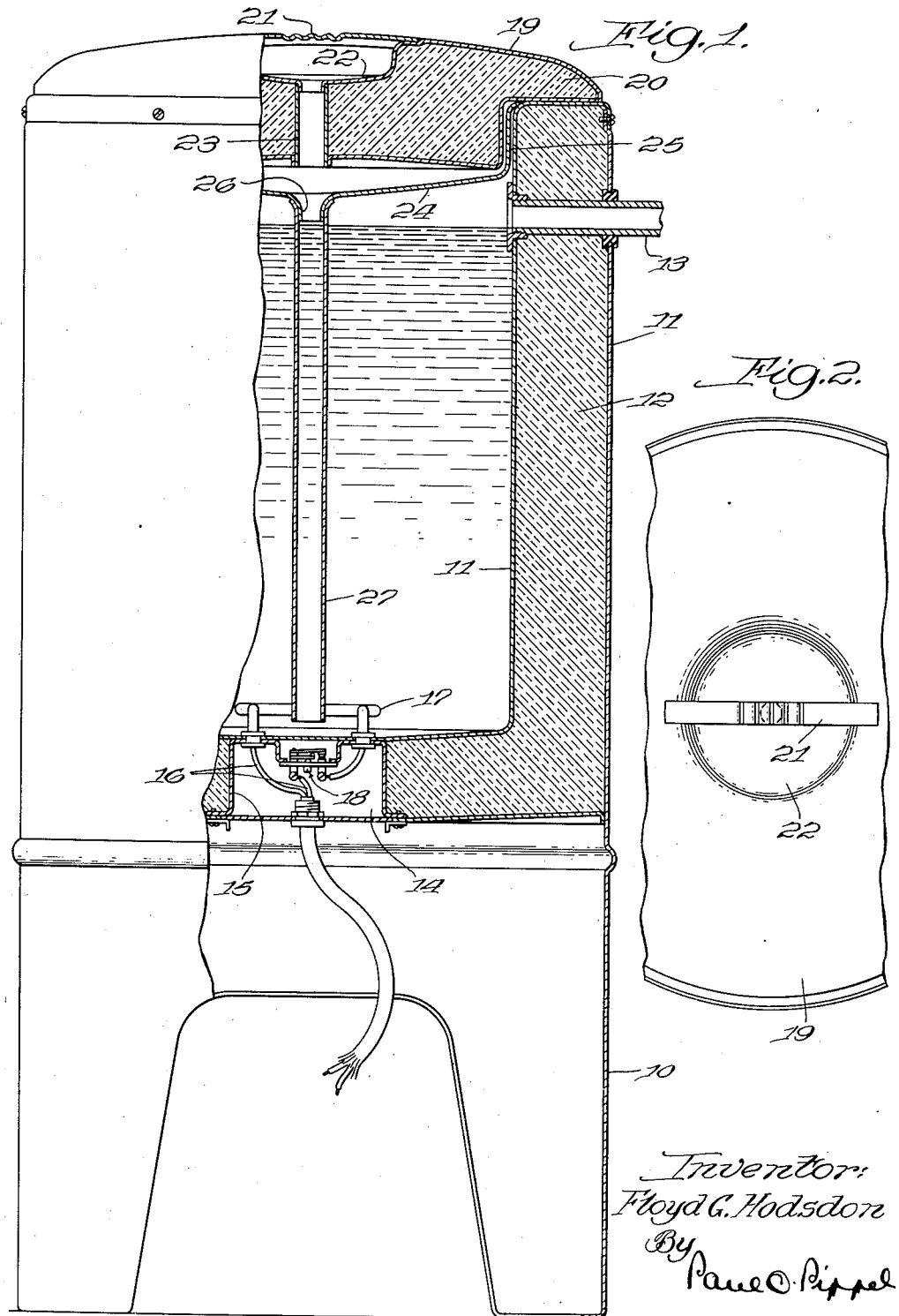
Inventor:
Floyd G. Hodsdon
By Paul O. Pippel
Atty.

Patented Apr. 19, 1949

2,467,749

UNITED STATES PATENT OFFICE 2,467,749

HOT-WATER HEATER

Floyd G. Hodsdon, Milwaukee, Wis., assignor to International Harvester Company, a corporation of New Jersey Application October 16, 1944, Serial No. 558,787

5 Claims. (Cl. 219—38)

This invention relates to a hot-water heater.

In many places, such for example in connection with the use of dairy equipment, it is desirable to have a simple and effective means for providing a continuous supply of hot water to be used for sterilization purposes. Heretofore, hot-water heaters used for these purposes have been difficult to clean because the water was heated in a closed vessel to which access could not readily be had for the removal of sedimentary deposits and generally for keeping the vessel clean. Some hot-water heaters also employed an auxiliary vessel for charging the main main vessel with the water to be heated, resulting in a clumsy appearance and added cost.

The principal object of the present invention is to provide an improved and simplified hot-water heater which eliminates the need for an auxiliary charging vessel, thereby permitting a better, streamlined appearance.

Another object of the invention is to provide a hot-water heater in which the heating vessel can be easily inspected and cleaned.

Another object is to provide a hot-water heater in which, if a large volume of water is desired, the vessel may be quickly filled by simply removing a cover, or, if a small volume of water is desired, then such small volume may readily be added without removal of the cover.

Other important objects will become apparent as this disclosure is more fully made.

These desirable objects can be obtained by the preferred example of the invention shown in the accompanying sheet of drawings wherein it will be seen that the hot-water heater employs an upright vessel carried on a suitable stand and closed at its upper end by a removable cover. This cover has a handle formed therein, preferably flush with the top surface thereof, and below said handle the cover is provided with a depression from which extends through the cover a downwardly-disposed conduit so that water may be passed through the cover beneath the handle when the same remains in place on the vessel. A dish-shaped device is held beneath the cover on the top edge of the vessel, said dish-shaped member being provided with a depending supply conduit that extends to a point just above the bottom of the vessel. This dished member receives the water entering the vessel and causes it to be spread across the bottom of the vessel adjacent a heating element placed therebeneath. Near the top edge of the vessel is an outlet pipe for withdrawing heated water.

In the sheet of drawings,

Figure 1 shows a vertical elevational view partially in section to expose the interior structure; and Figure 2 is a fragmentary, top plan view showing the cover construction.

In the preferred example illustrated, a suitable base 10 is provided upon which rests a double-walled vessel or container 11, which vessel may be integral or separate with respect to the base 10, and the space betwen its walls 11 is packed with suitable insulation material 12. Near the top of the vessel is a laterally-extending, hot-water discharge conduit 13. At the bottom of the vessel 11 is a space 14 formed by a shell 15 to receive electric wires 16 electrically connected with a heating element 17 disposed in the bottom of the vessel 11. Associated in a conventional way with the electric heater in the space 14 is an adjustable thermostatic device 18 to enable setting of the heater so that the desired temperature of water may be had, these thermostats serving, depending upon their adjustment, to permit the water to be heated from about 140 deg. to 200 deg. F.

It will be noted that the top end of the vessel 11 is open, the same, however, being closable by a removable cover 19, said cover likewise being of double-wall construction and loaded with suitable insulation material 20, a portion of the cover extending down into the vessel while the other edge thereof rests on the top wall of the vessel, the cover consequently being self-centering or positioning. The top face of the cover 19 is formed with a handle 21, preferably flush therewith, to form a smooth top appearance. Below the handle 21 the cover is formed with a depression 22 extending into the insulation, and extending from the depression vertically downward is a supply conduit 23, so that when the cover is in place on the vessel, water may be passed around and below the handle 21 into the depression 22 and through the pipe 23 into the vessel 11. It has been found that if only a small amount of water is to be heated, such as a quart let us say, it is best to leave the cover in place and pour this quantity directly through the cover in a manner now made clear.

Beneath the cover 19 and between it and the top wall of the vessel 11 is loosely located a dish-shaped or dished member 24, the dished member being of a size substantially to close the top, open end of the vessel. This member, at the periphery thereof, is formed with an upstanding, annular wall 25 suitably shaped to hang on the top inner wall 11 of the vessel and in this manner the dished member is located in and held by the vessel. The cover rests upon an end portion of the wall 25 and upon the upper end of the vessel, thus serving to retain the dished member in place. This dished member has an opening in its bottom, as shown at 26, and connected with the opening and the dished member is a depending conduit 27 of a length to hang down in the vessel to a point just above the bottom thereof.

In using the heater, it will be assembled in the fashion shown in Figure 1 and may be stood directly beneath a water faucet so that water, continuously and at the speed desired, drains into the depression 22 through the pipe 23 and down the tail conduit 27 to the bottom of the vessel where it is spread just above the heating element. The hot water then rises and finds egress through the conduit 13 so that in this fashion a continuous supply of hot water is available. Another way of using the device would be to remove the cover 19 and then pour water onto the dished member 24 to load the vessel to the level of the outflow conduit 13, the cover then being restored to place and the water heated. If only a small amount of water is desired to be heated, then the cover may be left in place and the filling can be done through the cover, past the handle 21 into the depression 22 and through the conduit 23. For cleaning purposes, the cover is easily removed and so is the dished member 24 so that the vessel may have its interior easily cleaned or if need be have leaks or other repairs made thereto.

From this disclosure it is now plain that an improved hot-water heater has been provided which achieves the desirable objects for the invention heretofore recited. It is the intention to cover all such changes of the form disclosed which do not depart from the spirit and scope of the invention as it is defined in the following claims.

What is claimed is:

1. A hot water heater comprising in combination, a vessel for containing the liquid to be heated, said vessel having an open upper end and including spaced walls having an insulating material therebetween, a hot water outlet for said vessel, a supply conduit extending vertically downwardly near the bottom of said vessel, a cover for closing the open end of said vessel, said cover including a pair of spaced wall members having an insulating material therebetween, a depression formed in said cover, an upright filler conduit in said cover in communication with said depression and said supply conduit for supplying water to be heated to said vessel, and a heating element within said vessel for heating said water.

2. A hot water heater comprising in combination, a vessel for containing the liquid to be heated, said vessel having an open upper end and including spaced walls having insulating material therebetween, an outlet conduit near the top of said vessel, a heating element within said vessel, a dish-shaped member loosely hung from the top of said vessel, said dish-shaped member having a conduit extending downwardly and terminating near the bottom of said vessel, a cover for closing the open end of said vessel, said cover including a pair of spaced walls having insulating material therebetween, a depression formed in said cover, and an upright filler conduit in communication with said depression.

3. A hot water heater comprising in combination, a vessel for containing the liquid to be heated, said vessel having an open upper end and including a pair of spaced walls having insulating material therebetween, an outlet conduit near the upper end of said vessel, a heating element disposed within said vessel, a dish-shaped member positioned near the top of said vessel, said dish-shaped member having a conduit extending downwardly and terminating near the bottom of said vessel, a cover for closing the open end of said vessel, said cover being constructed to retain said dish-shaped member in place, said cover including a pair of spaced walls having insulating material therebetween, a depression formed in said cover and in said insulating material, a handle on said cover, and an upright filler conduit in said cover, said conduit being in communication with said depression and in substantial axial alinement with the conduit of said dish-shaped member.

4. A hot water heater comprising in combination, a vessel for containing the liquid to be heated, said vessel having an open upper end and including a pair of spaced walls having insulating material therebetween, an outlet near the open end of said vessel, said outlet conduit extending through the insulating material and said walls, a heating element for said vessel, a dish-shaped member suspended from the top of said vessel, said dish-shaped member having a substantially centrally positioned conduit extending downwardly and terminating near the bottom of said vessel near said heating element, a cover disposed entirely above a predetermined level of the liquid in the vessel for closing the open end of said vessel, said cover being constructed to rest upon portions of said dish-shaped member and said vessel for holding said dish-shaped member in place, said cover including a pair of spaced walls having insulating material therebetween, a depression substantially centrally formed in said cover and in said insulating material, a handle on said cover positioned above said depression, and an upright filler conduit in said cover, said conduit being in communication with said depression and in substantial axial alinement with the conduit of said dish-shaped member.

5. An electrical hot water heater comprising in combination, a vessel for containing the liquid to be heated, said vessel having an open upper end and including a pair of spaced walls having insulating material therebetween, an outlet conduit near the open end of said vessel, said outlet conduit extending through the insulating material and said walls, a heating element disposed in the bottom of said vessel, a dish-shaped member loosely hung from the top of said vessel, said dish-shaped member having a substantially centrally positioned conduit extending downwardly and terminating near the bottom of said vessel adjacent said heating element, a cover for closing the open end of said vessel, said cover being constructed to rest upon portions of said dish-shaped member and said vessel for holding said dish-shaped member in place, said cover including a pair of spaced walls with insulating material therebetween, a depression substantially centrally formed in said cover and in said insulating material, a handle on said cover, said handle being flush with the upper wall of said cover and positioned above said depression, and an upright filler conduit in said cover, said conduit being in communication with said depression and in substantial axial alinement with the conduit of said dish-shaped member.

FLOYD G. HODSDON.

REFERENCES CITED

The following references are of record in the file of this patent:

UNITED STATES PATENTS

| Number | Name | Date |
|---|---|---|
| Re. 21,393 | Losee | Mar. 12, 1940 |
| 844,780 | Cram | Feb. 19, 1907 |
| 873,653 | Belcher | Dec. 10, 1907 |
| 1,122,307 | Rhodes | Dec. 29, 1914 |
| 2,269,448 | Ferris | Jan. 13, 1942 |
| 2,299,053 | Ferris | Oct. 13, 1942 |
| 2,337,869 | Chapman | Dec. 28, 1943 |
| 2,408,403 | Babson et al. | Oct. 1, 1946 |
| 2,422,492 | Losee | June 17, 1947 |

FOREIGN PATENTS

| Number | Country | Date |
|---|---|---|
| 297 | Great Britain | Jan. 24, 1879 |
| 3,359 | Sweden | Jan. 9, 1892 |
| 577,175 | France | May 30, 1924 |